3,843,321
METHODS OF RECOVERING WASTE FIBERS
Arthur H. Drelich, Plainfield, N.J., assignor to
Johnson & Johnson, New Brunswick, N.J.
No Drawing. Filed Aug. 30, 1972, Ser. No. 285,389
Int. Cl. D06m 13/10, 11/14
U.S. Cl. 8—141                    15 Claims

ABSTRACT OF THE DISCLOSURE

Methods of recovering waste fibers from mixtures of waste fibers and synthetic, cross-linked resin materials which comprise: heating a mixture of waste fibers and synthetic, cross-linked resin materials within the range of from about 212° F. to about 275° F. for a period of from about ¾ hour to about five hours in an aqueous treating solution containing an alkali metal hydroxide and added normally liquid chemical agents such as ketones, alcohols, lactones, and sulfoxides, which initiate the decomposition or solubilization of the synthetic, cross-linked resin materials; adding a neutral or alkaline oxidizing agent to the mixture of waste fibers and synthetic, cross-linked resin materials; heating the mixture of waste fibers and synthetic, cross-linked resin materials in the presence of the neutral or alkaline oxidizing agent to complete the decomposition or solubilization of the synthetic, cross-linked resin materials; and recovering the waste fibers from the mixture of waste fibers and decomposed or solubilized synthetic, cross-linked resin materials.

---

The present invention relates to methods of recovering waste fibers from mixtures of such waste fibers and synthetic, cross-linked resin materials.

BACKGROUND OF THE INVENTION

In various industries such as the textile, leather, paper, paper products, and like industries, there is a need to recover fibers which have been coated or impregnated with resins. This need to recover fibers and recycle them grows increasingly important with the ever growing awareness of our basic ecological requirements.

In the following specification, the present invention will be described in particularity with reference to the recovery of fibers used in the manufacture of nonwoven fabrics in the textile industry. This, however, is merely illustrative and the broader aspects of the inventive concept are not to be construed as limited thereto.

One of the conventional commercial methods of making nonwoven fabrics is to prepare a relatively flat, fibrous web of several thicknesses or layers of fibers which are arranged generally in parallel or carded fashion, or distributed in random haphazard array.

These fibrous layers are then bonded, either in overall fashion or in intermittent print patterns, with an adhesive bonding agent or a synthetic resin, to form an integral, self-sustaining nonwoven fabric. At the end of the manufacturing operation, the nonwoven fabric is usually trimmed to a desired predetermined width, thus creating two relatively narrow edge strips of "trim waste." These strips of trim waste represent only a small proportion of the total finished nonwoven fabric, but ultimately accumulate to very considerable amounts and are well worth recovering and recycling, not only from an ecological viewpoint but also for economic reasons.

One very large class of synthetic resins used for bonding nonwoven fabrics comprises the polymers and copolymers of vinyl esters, of which polyvinyl acetate is presently the most important single member. Fortunately, these polyvinyl ester resins are susceptible to decomposition, solubilization, or saponification treatments with caustic and the fibers bonded thereby are recoverable by known methods.

Another large class of synthetic resins used for bonding nonwoven fabrics comprises the polymers and copolymers of vinyl halides, of which polyvinyl chloride is presently the most important single member. Fortunately, these polyvinyl chloride resins are susceptible to decomposition, solubilization, or saponification treatments with caustic and added ketones or alcohols (see U.S. Pat. 2,832,663 which issued Apr. 29, 1958) and the fibers bonded thereby are also recoverable.

In recent years, however, another class of synthetic resins have become very important commercially for bonding nonwoven fabrics. These resins are the self-cross-linkable acrylic resins which, unfortunately, are not susceptible to decomposition or solubilization treatments, either with caustic alone or with caustic and added chemicals such as ketones, alcohols, lactones, or sulfoxides.

Specifically, when nonwoven fabric "trim waste" which has been bonded with a well-cured, self-cross-linking acrylic resin is boiled under pressure at elevated temperatures in a dilute caustic-ketone, alcohol, lactone, or sulfoxide solution for a long period of time, the resin is attacked to some degree but is not completely decomposed or made soluble. The resin does break down to some degree but the resulting product is a viscous, slimy jelly which clings tenaciously to the fibers and does not wash out. If dried, the jelly-covered fibers become a tightly bonded, unworkable, stiff mass of fibers and resin.

It is therefore a principal purpose of the present invention to provide methods of recovering waste fibers from mixtures of such waste fibers and synthetic, cross-linked resin materials without degrading the fibers to a degree whereby their usefulness for recycling and reuse in textile or other processes for the production of fabrics or other fibrous products is not impaired.

STATEMENT OF THE INVENTION

It has been discovered that such principal purpose and other purposes to be described hereinafter can be accomplished by heating the mixture of waste fibers and synthetic, cross-linked resin materials within the range of from about 212° F. to about 275° F. for a period of from about ¾ hour to about five hours in an aqueous treating solution containing an alkali metal hydroxide and a normally liquid ketone, alcohol, lactone, or sulfoxide, to initiate the decomposition or solubilization of the synthetic, cross-linked resin materials; adding a neutral or alkaline oxidizing agent to the mixture of waste fibers and partially, decomposed or solubilized synthetic, cross-linked resin materials; heating the waste fibers synthetic, cross-linked resin materials in the presence of the neutral or alkaline oxidizing agent to complete the decomposition or solubilization of the synthetic, cross-linked resin; and recovering the waste fibers from the mixture of waste fibers and decomposed or solubilized synthetic, cross-linked resin materials.

GENERAL DESCRIPTION OF THE INVENTION

In the following specification, there are described preferred embodiments of the invention, but it is to be understood that the inventive concept is not to be considered limited to the specific embodiments disclosed except as determined by the scope of the appended claims.

THE FIBERS

The fibers which form the recoverable materials of the present inventive concept are primarily of cellulosic nature, such as cotton or rayon (viscose or regenerated cellulose). Other fibers, however, which are capable of resisting the chemical treatment described herein, without excessive degradation, decomposition, or solubilization, may also be applicable. Examples of such other applicable fibers include nylon polyamide 6/6 and 6, the polyolefins such as polyethylene and polypropylene, etc.

THE RESINS

The synthetic resin may be one or more of a relatively large group of synthetic resins well known in industry and may be of a self-cross-linking type or an externally cross-linking type. Specific examples of such synthetic cross-linkable resins include: (1) polymers and copolymers of vinyl halides such as plasticized and unplasticized polyvinyl chloride, polyvinyl chloride-polyvinyl acetate, polyvinyl chloride-methyl acrylate, ethylene-vinyl chloride, etc.; vinylidene polymers and copolymers, such as polyvinylidene chloride, polyvinylidene chloride-vinyl chloride, polyvinylidene chlorideethyl acrylate, polyvinylidene chloride-vinyl chloride-acrylonitrile, etc.; (2) polymers and copolymers of vinyl esters such as plasticized and unplasticized polyvinyl acetate, ethylene-vinyl acetate, acrylic-vinyl acetate, etc.; (3) polymers and copolymers of the polyacrylic resins such as ethyl acrylate, methyl acrylate, butyl acrylate, ethyl-butyl acrylate, ethyl hexyl acrylate, hydroxyethyl acrylate, dimethyl amino ethyl acrylate, etc.; (4) polymers and copolymers of the polymethacrylic resins such as methyl methacrylate, ethyl methacrylate, isopropyl methacrylate, butyl methacrylate, etc.; (5) nitrogen-containing polymers and copolymers of acrylonitrile, methacrylonitrile, acrylamide, N-isopropyl acrylamide, N-methylol acrylamide, methacrylamide, etc.; (6) copolymers of polyolefinic resins including ethylenevinyl chloride and ethylene-vinyl acetate which have been listed previously; etc.

These resins may be present either as homopolymers comprising a single repeating monomer unit, or they may be used as copolymers comprising two, three, or more different monomer units which are arranged in random fashion, or in a definite ordered alternating fashion, within the polymer chain. Also included within the inventive concept are the block polymers comprising relatively long blocks of different monomers in a polymer chain and graft polymers comprising chains of one monomer attached to the backbone of another polymer chain.

THE INITIAL HEATING STEP

The mixture of waste fibers and the synthetic cross-linked resin materials are initially heated with or without pressure at elevated temperatures within the range of from about 212° F. (with or without pressure) and 275° F. (with pressure) for a period of from about ¾ hour to about five hours in an aqueous treating solution containing an alkali metal hydroxide and a normally liquid organic compound such as a ketone, an alcohol, a lactone, or a sulfoxide.

The alkali metal hydroxide is preferably sodium hydroxide or potassium hydroxide and is present in the aqueous treating solution in a concentration of from about 1¾% by weight to about 5% by weight and preferably from about 2% by weight to about 4% by weight.

The normally liquid organic compound is a ketone, an alcohol, a lactone, or a sulfoxide, and includes compounds such as: aliphatic ketones including methyl ethyl ketone, methyl isobutyl ketone, ethyl isopropyl ketone, diethyl ketone, etc.; aliphatic monohydroxy alcohols such as methyl alcohol, ethyl alcohol, normal propyl alcohol, isopropyl alcohol, t-butyl alcohol, isobutyl alcoho, sec-buty alcohol, n-butyl alcohol, etc.; dihydroxy alcohols such as ethylene glycol, diethylene glycol, propylene glycol, etc.; other aromatic or heterocyclic alcohols such as tetrahydrofurfuryl alcohol, etc.; lactones such as 4-hydroxy butanoic acid lactone (butyrolactone), 4-hydroxy-2-methylene butanoic acid lactone, 4-hydroxy pentanoic acid lactone, 5-hydroxy pentanoic acid lactone, 4-hydroxy hexanoic acid lactone, etc.; sulfoxides such as dimethyl sulfoxide (DMSO); methyl ethyl sulfoxide, diethyl sulfoxide, methyl propyl sulfoxide, etc.

These organic compounds are liquids under normal conditions of room or ambient temperature and normal atmospheric pressure. Their water solubility must be such that they can form aqueous solutions of at least two percent by weight. Greater water solubility of ten percent by weight or even water miscibility is preferred. The concentration of the organic compound in the aqueous treating solution is in the range of from about two percent or slightly less by weight to about ten percent by weight.

Further specific details regarding the initial heating of the waste fibers and the synthetic, cross-linked resin materials are to be noted in U.S. Pat. 2,832,663 which issued Apr. 29, 1958.

During the initial heating under pressure, the synthetic, cross-linked resin is attacked to some degree but is not sufficiently decomposed so as to be rendered soluble. It becomes a viscous, slimy jelly which clings tenaciously to the fibers and does not wash out. In cases where the original resin component is a cross-linked polyacrylic ester, the jelly present at this stage is believed to be a high molecular weight, two or three-dimensional cross-linked polymer of sodium polyacrylate.

THE SUBSEQUENT HEATING STEP

The viscous, slimy, practically insoluble jelly is therefore treated further in order to enable a successful separation and recovery of the fibers.

The mass of fibers covered with the viscous, slimy jelly is rinsed to remove most of the alkali metal hydroxide and the normally liquid organic compound. Sufficient alkali metal hydroxide is permitted to remain, however, to provide a pH range of at least about 8½ and preferably at least about 9, up to about 11 or even higher, if desired or required.

The next step in the process involves a heat treatment of this fiber mass containing the viscous, slimy jelly in a treating solution containing a neutral or alkaline oxidizing agent such as sodium hypochlorite, sodium perborate, oxygen, hydrogen peroxide, alkali metal peroxides such as sodium peroxide, potassium peroxide, lithium peroxide; alkaline earth metal peroxides such as barium peroxide, calcium peroxides; etc.

The neutral or alkaline oxidizing agent is present in the solution in a concentration of from about 0.1% by weight to about 8% by weight and preferably from about 0.2% by weight to about 4% by weight. These limits are, of course, dependent upon the relative activity of the oxidizing agent used. Sodium perborate is relatively less active and requires greater concentrations; sodium hypochlorite is relatively more active and permits lesser concentrations. The upper limits of the concentrations used are naturally dictated by the possibility of damage or degradation to the fibers being recovered.

This heating step is accomplished by simply heating, preferably to the boiling point of the treating solution, and, if necessary, holding the treating solution at the elevated temperature or boiling point for a few minutes. In some instances, it has been found that merely heating to near the atmospheric boiling point is sufficient. Freedom of access of the oxidizing agent to the resin materials being treated is important.

During this heating step, the ratio of the amount of liquid to the amount of fibers should be kept within controlled limits. This ratio must be at least about 4:1 to permit access of the treating agent to the jellied fiber mass. Higher ratios may be employed up to 10:1 or even as high as 25:1 but such higher ratios are not desirable from an economical viewpoint inasmuch as increased amounts of the neutral or alkaline oxidizing agents are required with such larger volumes of water.

This treatment decomposes and breaks down the viscous, slimy jelly into a water-soluble form whereby it is easily removed. It is believed that the oxidizing agent breaks down the chain length of the jelly-like polymer into water or alkali soluble fragments, without damaging the recoverable fibers. The fibers are then washed with water, preferably at room temperature, and dried, forming a loose, fluffy, unbonded, resin-free mass of fibers. Degradation of the fibers is of such a low order that the usefulness of the fibers is not impaired for recycling and re-use in the production of nonwoven, woven, or knitted fabrics by textile processes, or the production of other fibrous products by other manufacturing processes.

The invention will be further illustrated in greater detail by the following specific examples. It should be understood, however, that although these examples may describe in particular detail some of the more specific features of the invention, they are given primarily for purposes of illustration and the invention in its broader aspects is not to be construed as limited thereto.

EXAMPLE I

One hundred grams of rayon trim waste fibers produced in the course of the manufacture of nonwoven fabrics comprising several layers of card webs and containing as a bonding agent approximately 20% (20 grams) of synthetic self-cross-linked polyethyl acrylate is introduced into a vessel containing 700 grams of water, 21 grams of sodium hydroxide, and 21 grams of tetrahydrofurfuryl alcohol (THFA). The mixture of waste fibers and polyethyl acrylate is heated for a period of two hours at a temperature of 250° F. The polyethyl acrylate is attacked during this heating step, but is not solubilized. It becomes a viscous, slimy jelly which clings tenaciously to the fibers and does not wash out.

The slimy mass of rayon trim waste fibers and polyethyl acrylate resin is then rinsed in water to remove part of the sodium hydroxide, but sufficient sodium hydroxide remains to provide a pH of 9. While the fibrous mass is still wet, a sufficient amount of hydrogen peroxide is added to provide a concentration of hydrogen peroxide in the total composition of about 1%. Intimate contact is provided between the hydrogen peroxide and the slimy mass of jellied fibers. The mixture is then heated to boiling. During this heating, the hydrogen peroxide attacks, decomposes and breaks down the jelly-like synthetic resin into a water soluble form. The fibers are then washed and dried, forming a loose, fluffy, unbonded, resin-free mass of fibers. Degradation of the fibers is of such a low order that their usefulness in textile processes for the production of nonwoven, woven or knitted fabrics is not impaired.

EXAMPLE II

The procedures of Example I are followed substantially as set forth therein with the exception that the cross-linked resin is a copolymer of polyetheyl acrylate and methyl metacrylate. The results are generally comparable to the results obtained in Example I. The fibers are recovered in loose, fluffy, unbonded, resin-free form. Degradation of the fibers of such a low order that their usefulness in textile processes for the production of fabrics is not impaired.

EXAMPLE III

The procedures of Example I are followed substantially as set forth therein with the exception that the cross-linked resin is a copolymer including butyl acrylate. The results are generally comparable to the results obtained in Example I. The fibers are recovered in loose, fluffy, unbonded, resin-free form. Degradation of the fibers is of such a low order that their usefulness in textile processes for the production of fabrics is not impaired.

EXAMPLE IV

The procedures of Example I are followed substantially as set forth therein with the exception that the cross-linked resin is a copolymer of butyl acrylate and ethyl acrylate. The results are generally comparable to the results obtained in Example I. The fibers are recovered in loose, fluffy, unbonded. resin-free form. Degradation of the fibers is of such a low order that their usefulness in textile processes for the production of fabrics is not impaired.

EXAMPLE V

The procedures of Example I are followed substantially as set forth therein with the exception that the tetrahydrofurfuryl alcohol is replaced by normal propyl alcohol. The results are generally comparable to the results obtained in Example I. The fibers are recovered in a loose, fluffy, unbonded resin-free form. Degradation of the fibers is of such a low order that their usefulness in textile processes for the production of fabrics is not impaired.

EXAMPLE VI

The procedures of Example I are followed substantially as set forth therein with the exception that the tetrahydrofurfuryl alcohol is replaced by normal butyl alcohol. The results are generally comparable to the results obtained in Example I. The fibers are recovered in a loose, fluffy, unbonded, resin-free form. Degradation of the fibers is of such a low order that their usefulness in textile processes for the production of fabrics is not impaired.

EXAMPLE VII

The procedures of Example I are followed substantially as set forth therein with the exception that the tetrahydrofurfuryl alcohol is replaced by ethylene glycol. The results are generally comparable to the results obtained in Example I. The fibers are recovered in a loose, fluffy, unbonded resin-free form. Degradation of the fibers is of such a low order that their usefulness in textile processes for the production of fabrics is not impaired.

EXAMPLE VIII

The procedures of Example I are followed substantially as set forth therein with the exception that the tetrahydrofurfuryl alcohol is replaced by gamma butyrolactone. The results are generally comparable to the results obtained in Example I. The fibers are recovered in loose, fluffy, unbonded resin-free form. Degradation of the fibers is of such a low order that their usefulness in textile processes for the production of fabrics is not impaired.

EXAMPLE IX

The procedures of Example I are followed substantially as set forth therein with the exception that the tetrahydrofurfuryl alcohol is replaced by dimethyl sulfoxide. The results are generally comparable to the results obtained in Example I. The fibers are recovered in loose, fluffy, unbonded rein-free form. Degradation of the fibers is of such a low order that their usefulness in textile processes for the production of fabrics is not impaired.

EXAMPLE X

The procedures of Example I are followed substantially as set forth therein with the exception that the tetrahydrofurfuryl alcohol is replaced by methyl ethyl ketone. The results are generally comparable to the results obtained in Example I. The fibers are recovered in loose. fluffy, unbonded resin-free form. Degradation of the fibers is of such a low order that their usefulness in textile processsses for the production of fabrics is not impaired.

EXAMPLE XI

The procedures of Example I are followed substantially as set forth therein with the exception that the hydrogen peroxide is replaced by sodium peroxide. The results are generally comparable to the results obtained in Example I. The fibers are recovered in a loose, fluffy, unbonded, resin-free form. Degradation of the fibers is of such a low order that their usefulness in textile processes for the production of fabrics is not impaired.

EXAMPLE XII

The procedures of Example I are followed substantially as set forth therein with the exception that the hydrogen peroxide is replaced by potassium peroxide. The results are generally comparable to the results obtained in Example I. The fibers are recovered in a loose, fluffy, unbonded, resin-free form. Degradation of the fibers is of such a low order that their usefulness in textile processes for the production of fabrics is not impaired.

EXAMPLE XIII

The procedures of Example I are followed substantially as set forth therein with the exception that the hydrogen peroxide is replaced by sodium perborate. A sufficient amount of sodium perborate is added to provide a concentration of about 3% by weight in the total composition. The results are generally comparable to the results obtained in Example I. The fibers are recovered in loose, fluffy, unbonded resin-free form. Degradation of the fibers is of such a low order that their usefulness in textile processes for the production of fabrics is not impaired.

EXAMPLE XIV

The procedures of Example I are followed substantially as set forth therein with the exception that the hydrogen peroxide is replaced with sodium hypochlorite. The sodium hyprochlorite content is approximately 0.2% by weight and the treating cycle is one hour at 40° C. The results are generally comparable to the results obtained in Example I. The fibers are recovered in loose, fluffy, unbonded resin-free form. Degradation of the fibers is of such a low order that their usefulness in textile processes for the production of fabrics is not impaired.

EXAMPLE XV

The procedures of Example I are followed substantially as set forth therein with respect to the first step of initiating the breakdown of the cross-linked resin to form the practically insoluble jelly or slime on the rayon fibers. These fibers are rinsed to remove most of the excess caustic, bringing the pH to about 9, and surplus liquid is removed by centrifuging to bring the fiber:liquid ratio down to about 1:10.

Gaseous oxygen is bubbled slowly (10 ml. oxygen per minute) through the wet fibrous mass for one hour with excellent access to the jellied fibers while the wet fibrous mass is maintained at a temperature of about 90° C. The treated fibers are rinsed in water, removing the remaining caustic and the degradation products of the resin which are now water-soluble.

The fibers are recovered in a loose, fluffy, unbonded resin-free form. Degradation of fibers is of such low order that their usefulness in textile processes for the production of fabrics is not impaired.

EXAMPLE XVI

The procedures of Example XV are followed substantially as set forth therein except that air is bubbled slowly through the wet fibrous mass for three hours. The results are similar to those obtained in Example XV.

EXAMPLE XVII

The procedures of Example I are followed substantially as set forth therein with the exception that the fibers are cotton. The fibers are recovered in a loose, fluffy, unbonded resin-free form. Degradation of the fibers is of such a low order that their usefulness in textile processes for the production of fabrics is not impaired.

EXAMPLE XVIII

The procedures of Example I are followed substantially as set forth therein with the exception that the fibers are nylon polyamide 6/6. The fibers are recovered in a loose, fluffy, unbonded resin-free form. Degradation of the fibers is of such a low order that their usefulness in textile processes for the production of fabrics is not impaired.

EXAMPLE XIX

The procedures of Example I are followed substantially as set forth therein with the exception that the fibers are nylon polyamide 6. The fibers are recovered in a loose, fluffy, unbonded resin-free form. Degradation of the fibers is of such a low order that their usefulness in textile processes for the production of fabrics is not impaired.

EXAMPLE XX

The procedures of Example I are followed substantially as set forth therein with the exception that the rinsing of the slimy mass of resin trim waste fibers and polyethyl acrylate is such as to provide a pH of (a) 8½, (b) 10, and (c) 11. The results are generally comparable to the results obtained in Example I. The fibers are recovered in loose, fluffy, unbonded, resin-free form. Degradation of the fibers is of such a low order that their usefulness in textile processes for the production of fabrics is not impaired.

EXAMPLE XXI

The procedures of Example I are followed substantially as set forth therein with the exception that the amount of hydrogen peroxide which is added is changed so that the concentration of hydrogen peroxide in the total composition becomes (a) ½%, (b) 2%, and (c) 3%. The results are generally comparable to the results obtained in Example I. The fibers are recovered in loose, fluffy, unbonded resin-free form. Degradation of the fibers is of such a low order that their usefulness in textile processes for the production of fabrics is not impaired.

Although several specific examples of the inventive concept have been described, the same should not be construed as limited thereby nor to the specific features mentioned therein but to include various other equivalent features as set forth in the claims appended hereto. It is understood that any suitable changes, modifications and variations may be made without departing from the spirit and scope of the invention.

What is claimed is:

1. A method of recovering waste fibers from a mixture of waste fibers and synthetic, cross-linked resin binder materials which coat or impregnate said waste fibers which comprises: heating said mixture of waste fibers and synthetic, cross-linked resin binder materials which coat or impregnate said waste fibers within the range of from about 212° F. to about 275° F. for a period of from about ¾ hour to about five hours in an aqueous treating solution containing an alkali metal hydroxide and a normally liquid, organic compound selected from the group consisting of hydrocarbon ketones, alcohols, lactones and sulfoxides, said normally liquid organic compound being sufficiently water-soluble as to be capable of forming aqueous solutions of at least about two percent by weight; adding a neutral or alkaline oxidizing agent to the mixture of waste fibers and synthetic, cross-linked resin materials; heating the mixture of waste fibers and synthetic, cross-linked materials in the presence of said neutral or alkaline oxidizing agent to partially decompose or solubilize the synthetic, cross-linked resin; and recovering the waste fibers from the mixture of waste fibers and decomposed or solubilized synthetic, cross-linked resin materials.

2. A method as defined in claim 1 wherein the oxidizing agent is hydrogen peroxide.

3. A method as defined in claim 1 wherein the oxidizing agent is gaseous oxygen.

4. A method as defined in claim 1 wherein the oxidizing agent is sodium hypochlorite.

5. A method as defined in claim 1 wherein the oxidizing agent is sodium perborate.

6. A method as defined in claim 1 wherein the addition of the oxidizing agent takes place during the heating of the waste fibers and synthetic, cross-linked resin materials.

7. A method as defined in claim 1 wherein the normaly liquid organic compound is normal propyl alcohol.

8. A method as defined in claim 1 wherein the normally liquid organic compound is methyl ethyl ketone.

9. A method as defined in claim 1 wherein the normaly liquid organic compound is tetrahydrofurfuryl alcohol.

10. A method as defined in claim 1 wherein the normally liquid organic compound is gamma butyrolactone.

11. A method as defined in claim 1 wherein the normally liquid organic compound is dimethyl sulfoxide.

12. A method as defined in claim 1 wherein said alkali metal hydroxide is present in a concentration of from about 1¾% by weight to about 5% by weight.

13. A method as defined in claim 1 wherein said normally liquid, organic compound is present in the range of from about two percent by weight to about ten percent by weight.

14. A method as defined in claim 1 wherein said neutral or alkaline oxidizing agent is present in a concentration of from about 0.1% by weight to about 8% by weight.

15. A method as defined in claim 1 wherein the neutral or alkaline oxidizing agent is present at a pH from about 8½ to about 11.

References Cited
UNITED STATES PATENTS 2,832,663    4/1958    Drelich _____ 8—141

MAYER WEINBLATT, Primary Examiner

U.S. Cl. X.R.

8—137